US010750755B2

(12) United States Patent
Fee et al.

(10) Patent No.: US 10,750,755 B2
(45) Date of Patent: Aug. 25, 2020

(54) CONTINUOUS PROCESS TO PRODUCE FIRMER PROCESSED VEGETABLES

(71) Applicants: General Mills, Inc., Minneapolis, MN (US); Oregon Potato Company, Paso, WA (US)

(72) Inventors: Lily Leung Fee, St. Anthony, MN (US); Donald F. Steenson, Plymouth, MN (US); Robert Erickson, Crystal, MN (US); Mark Stueber, Henderson, MN (US); Anita J Hall, Bloomington, MN (US); Frank Tiegs, Pasco, WA (US); Steve Harris, Pasco, WA (US); Craig Bolt, Pasco, WA (US)

(73) Assignees: General Mills, Inc., Minneapolis, MN (US); Oregon Potato Company, Paso, WA (US)

( * ) Notice: Subject to any disclaimer, the term of this patent is extended or adjusted under 35 U.S.C. 154(b) by 1013 days.

(21) Appl. No.: 14/890,745

(22) PCT Filed: May 14, 2014

(86) PCT No.: PCT/US2014/037968
§ 371 (c)(1),
(2) Date: Nov. 12, 2015

(87) PCT Pub. No.: WO2014/186443
PCT Pub. Date: Nov. 20, 2014

(65) Prior Publication Data
US 2016/0100598 A1    Apr. 14, 2016

Related U.S. Application Data

(60) Provisional application No. 61/823,157, filed on May 14, 2013.

(51) Int. Cl.
A23B 7/157 (2006.01)
A23B 7/06 (2006.01)
A23B 7/154 (2006.01)

(52) U.S. Cl.
CPC ............... *A23B 7/157* (2013.01); *A23B 7/06* (2013.01); *A23B 7/154* (2013.01)

(58) Field of Classification Search
CPC ............ A23B 7/154; A23B 7/157; A23B 7/06
See application file for complete search history.

(56) References Cited

U.S. PATENT DOCUMENTS 3,722,401 A * 3/1973 Davidson ............... A23N 12/00
134/105
4,702,161 A 10/1987 Andersen
(Continued)

OTHER PUBLICATIONS

Palma-Zavala et al., "Effect of Stepwise Blanching and Calcium Chloride Solution on Texture and Structural Properties of Jalapeno Peppers in Brine", Food Technology and Biotechnology, vol. 47, No. 4, pp. 464-470, 2009.
(Continued)

*Primary Examiner* — Steven N Leff
(74) *Attorney, Agent, or Firm* — Diederiks & Whitelaw, PLC; John L. Crimmins, Esq.

(57) ABSTRACT

A continuous method for improving the firmness of vegetable products uses a continuous vegetable product treatment device comprising a vegetable product treatment chamber having a vegetable product inlet, a vegetable product outlet, a vegetable product transport mechanism for urging the vegetable product toward the vegetable product outlet, and at least one liquid introduction orifice for introducing a liquid. Vegetable product is continuously treated in the chamber at a temperature of from about 125° F. to about 160° F., and the liquid in the treatment chamber is maintained at a pH of from about 5 to about 7. Individual
(Continued)

vegetable products reside in the treatment chamber for a time of from about 20 minutes to about 60 minutes. The heat-treated vegetable products are blanched in a subsequent blanching step at a temperature ranging from about 190° F. to 210° F. for a time of from about two to about 10 minutes.

19 Claims, 1 Drawing Sheet

(56) References Cited

U.S. PATENT DOCUMENTS

| | | | |
|---|---|---|---|
| 5,607,712 | A | 3/1997 | Bourne |
| 6,004,590 | A | 12/1999 | Subramaniarn et al. |
| 6,004,601 | A | 12/1999 | Donato et al. |
| 2004/0065094 | A1 | 4/2004 | Ormerod et al. |
| 2008/0069923 | A1* | 3/2008 | Chukwu .............. A23B 7/0205 426/49 |
| 2008/0311664 | A1 | 12/2008 | Schmidt |

OTHER PUBLICATIONS

Quintero-Ramos et al., "Low Temperature Blanching of Frozen Carrots with Calcium Chloride Solutions at Different Holding Times on Texture of Frozen Carrots", Journal of Food Processing and Preservation, vol. 26, pp. 361-374, 2002.

Sila, Daniel N., et al., "Influence of Pretreatment Conditions on the Texture and Cell Wall Components of Carrots During Thermal Processing", Journal of Food Science, vol. 70, No. 2, pp. E85-E91, (2005).

\* cited by examiner

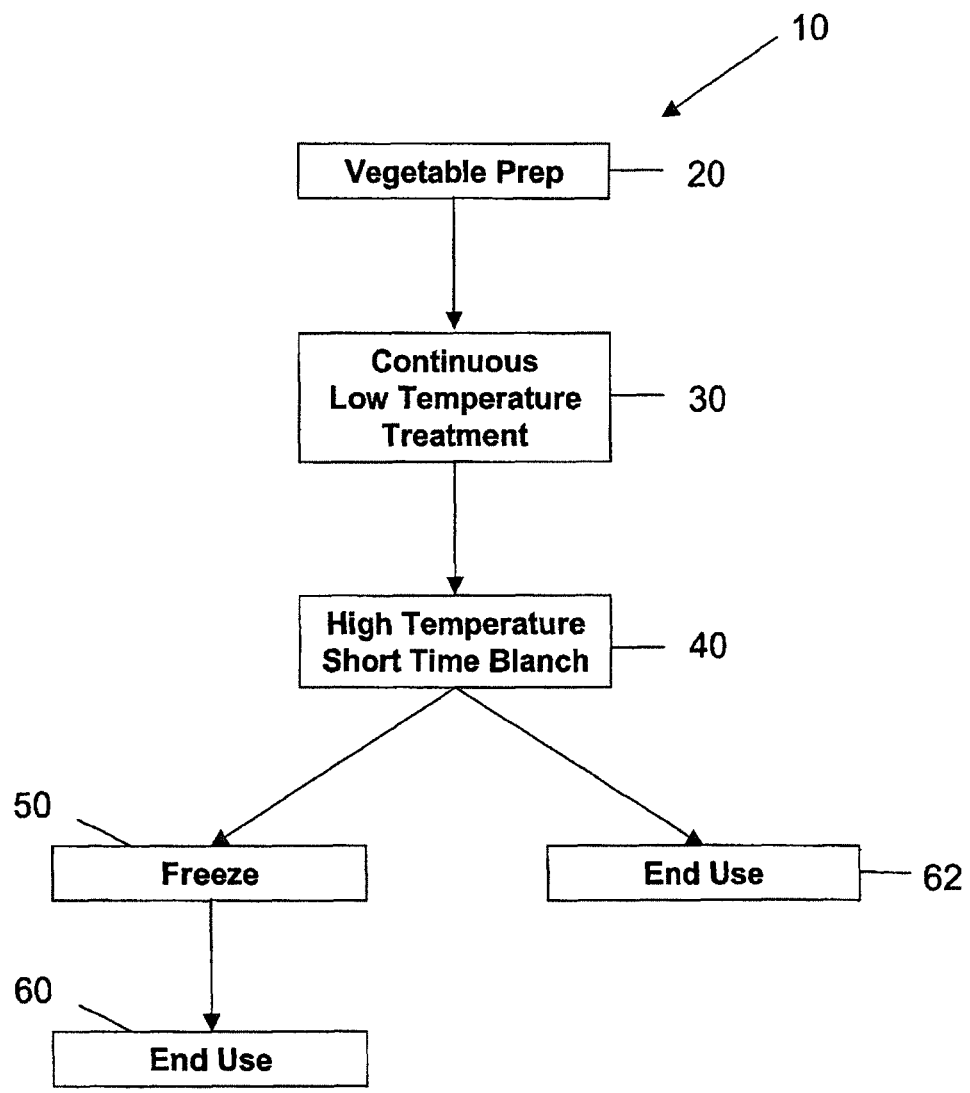

CONTINUOUS PROCESS TO PRODUCE FIRMER PROCESSED VEGETABLES

CROSS-REFERENCE TO RELATED APPLICATIONS

The present application represents a National Stage application of PCT/US2014/037968 entitled "Continuous Process to Produce Firmer Processed Vegetables" filed May 14, 2014, pending, which claims the benefit of U.S. Provisional patent application Ser. No. 61/823,157 filed May 14, 2013 and entitled "Continuous Process to Produce Firmer Processed Vegetables".

FIELD OF THE INVENTION

The present invention relates to a method for treating vegetables. More specifically, the present invention relates to a continuous method for improving the firmness of vegetable products.

BACKGROUND OF THE INVENTION

Various food storage techniques have been developed to provide otherwise perishable food products, and particularly vegetables. Many of these techniques involve thermal treatments to destroy microorganisms. However, thermal treatments are also known to adversely affect certain organoleptic properties, and especially the texture of vegetables.

Studies have been conducted for treatment of vegetables to improve firmness of the vegetables. One approach has been the use of "low-temperature, long-time" treatments or 'blanching' with and without calcium treatment of carrots and other vegetables for batch production. Some work focused on a calcium or low temperature treatment that occurs in the can for canned vegetables, although some work used a batch blanch prior to canning.

U.S. Pat. No. 5,607,712 to Bourne describes a method of improving firmness in frozen vegetables by a two-step blanch prior to freezing consisting essentially of a lower temperature blanch to activate pectin methyl esterase in the vegetable to increase firmness followed by a higher temperature blanch to inactivate enzymes thereby to prevent the development of off flavors during frozen storage is retained when the frozen vegetables are canned and heat sterilized. This patent asserts that the firming effect is accentuated when the food grade calcium salt is added or when a food grade acid is added to reduce the pH below 4.5. The greatest firming effect is stated to be obtained when both a food grade acid and a food grade calcium salt are added. See the Abstract.

U.S. Pat. No. RE 40,232 to Zittel describes a method and rotary blancher for processing food product using a heat transfer medium and directed flows of a fluid that can comprise a liquid, a gas, a vapor or a combination thereof The blancher and method are described to be used to process food product by blanching, cooking and pasteurizing, and is stated to be suited for processing relatively heavy food products having a density of at least 55 lbs/ft.sup.3 using discharged liquid and gas, and also to be suited for processing food products having a lesser density using only discharged gas. See the Abstract.

SUMMARY OF THE INVENTION

Obtaining product throughput that is acceptable for commercial operations while achieving desired product quality standards is challenging. Scale up of vegetable treatment processes to industrial production capacity and efficiency levels introduces new challenges not contemplated or even observable when a type of production is first considered at the lab bench batch scale level.

The present method provides a continuous method for improving the firmness of vegetable products. In this method, a continuous vegetable product treatment device is provided that comprises a vegetable product treatment chamber having a vegetable product inlet, a vegetable product outlet, a vegetable product transport mechanism in the vegetable product treatment chamber for urging the vegetable product toward the vegetable product outlet, and at least one liquid introduction orifice for introducing a liquid in the vegetable product treatment chamber. Vegetable products are introduced into the vegetable product treatment chamber via the vegetable product inlet and liquid is introduced into the vegetable product treatment chamber via the vegetable product inlet and/or the liquid introduction orifice. The vegetable products are urged toward the vegetable product outlet by operation of the vegetable product transport mechanism while maintaining the temperature of the vegetable product in the vegetable product treatment chamber at a temperature of from about 125° F. to about 160° F. The liquid is maintained in the vegetable product treatment chamber at a pH of from about 5 to about 7. The vegetable product is urged toward the vegetable product outlet at a rate so that individual vegetable products reside in the vegetable product treatment chamber for a time of from about 20 minutes to about 60 minutes. The vegetable product is removed from the vegetable product treatment chamber via the vegetable product outlet to provide heat-treated vegetable products. In a subsequent blanching step, the heat-treated vegetable products are treated at a temperature ranging from about 190° F. to 210° F. for a time of from about two to about 10 minutes.

It has been found that in the present continuous process, it is advantageous to maintain the liquid in the vegetable product treatment chamber at a pH of from about 5 to about 7. This higher pH provides superior vegetable firmness characteristics as compared to like vegetables treated under lower pH conditions. Further, it has been found that over time the pH of the liquid in a continuous process naturally drifts downward as a large volume of vegetables pass through the treatment system. In a continuous process such as the present process, at least a portion of the liquid introduced to the vegetable product treatment chamber remains in the treatment chamber until the treatment chamber is fully discharged of its contents, for example at the end of a production run. While not being bound by theory, it is believed that naturally present acids or acid precursors leach out from the vegetables and drive down the pH of the liquid resident in the vegetable product treatment chamber. Because of the unique characteristics of the present continuous process, it was discovered that pH maintenance to control the pH of the liquid present in the vegetable product treatment chamber at a pH of from about 5 to about 7 was both necessary and advantageous.

Vegetables that have been treated by the present continuous process may advantageously be used in particular as a frozen product or as a component of a canned product. For example, products such as soups that incorporate a vegetable that has been treated according to the present method exhibit significant superior organoleptic properties over like products where the vegetable has not been so treated. The present process thus affords the production of high volumes of vegetables that better retain firmness through further processing such as freezing and retorting.

BRIEF DESCRIPTION OF THE DRAWINGS

The accompanying drawings, which are incorporated in and constitute a part of this application, illustrate several aspects of the invention and together with a description of the embodiments serve to explain the principles of the invention. A brief description of the drawings is as follows:

FIG. 1 is a schematic process flow diagram of an embodiment of vegetable processing.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

Turning to FIG. 1, an overview of the present method in the vegetable processing system will now be provided. FIG. 1 shows a schematic process flow diagram of an embodiment of a vegetable processing plan 10. Vegetables are provided and are prepared for further processing in step 20. Such processing can include vegetable cleaning, cutting, sorting, peeling and the like. In step 30, vegetables are then introduced into the continuous vegetable product treatment device where a continuous low temperature treatment is carried out as described in more detail herein. The vegetables are then removed from the vegetable product treatment chamber and are subjected in step 40 to a high temperature short-term blanch. At this stage in the processing plan, the vegetables may optionally be frozen in step 50 to be stored for use in subsequent end uses 60. Examples of end uses include canning or pouching in the form of single or mixed vegetables, incorporation into soups or pre-prepared canned or pouched meals and entrees, other products prepared using a retort step, incorporation into frozen products such a mixed vegetables, mixed food dishes, or the like. Intermediate freezing of vegetables before subsequent processing is desirable when processing perishable vegetable items that benefit from prompt treatment after harvest, while the vegetable is at its natural peak in desired texture. The vegetable can be frozen for storage until, for example, other vegetable ingredients that are harvested at different seasons can be obtained. All vegetables to be assembled in the final mixed product can be retorted and finally packaged at the same time.

Alternatively, the vegetables may be directly used in the end use 62. Examples of direct end uses include immediate canning or pouching in the form of single or mixed vegetables, incorporation into soups or pre-prepared canned or pouched meals and entrees, other products prepared using a retort step, incorporation into frozen products such a mixed vegetables, mixed food dishes, or the like.

Vegetables to be treated in the present method may be any vegetable that would benefit from improving the firmness thereof. In an embodiment, the vegetable is selected from the group consisting of green beans, green peas, bell peppers, green chilies, ancho chili peppers, cauliflower, cabbage, broccoli, onions, zucchini, celery, carrots, corn, cucumbers, edible peapods, and wax beans. In a preferred embodiment, the vegetable is carrots.

In the present method, a continuous vegetable product treatment device is used to carry out the vegetable treatment process. This device comprises a vegetable product treatment chamber having a vegetable product inlet, a vegetable product outlet, a vegetable product transport mechanism in the vegetable product treatment chamber for urging the vegetable product toward the vegetable product outlet.

The vegetable product inlet is an opening suitable for introduction of vegetable product to the vegetable product treatment chamber. Preferably, the vegetable product inlet is provided with a chute or similar construction that permits introduction of the vegetable product in a manner that does not cause undue physical damage or bruising to the vegetable products. In an embodiment, the vegetable products are introduced to the vegetable product treatment chamber as a slurry with a liquid. In an embodiment, the vegetable products are introduced to the vegetable product treatment chamber in a relatively dry state to a liquid already in the vegetable product treatment chamber.

The transport mechanism is any mechanism suitable for conveying vegetable products through the vegetable product treatment chamber from the vegetable product inlet to the vegetable product outlet, so that individual vegetable products are exposed to the desired treatment conditions for the desired time period.

In an embodiment of the present method, the transport mechanism is an auger or helical screw that rotates during use to urge the vegetable product to the vegetable product outlet. Auger configurations are described in U.S. Pat. No. RE 40,232, the disclosure of which is incorporated herein by reference.

In an embodiment of the present method, the transport mechanism comprises a conveyer belt configured to urge the vegetable product to the vegetable product outlet. For example, the conveyor belt may be provided with a series of panels perpendicular to the direction of the conveyor belt to urge the vegetable products to the desired direction. The panels may be provided with perforations or may be appropriately sized mesh screens to permit liquid to flow through the panel while transporting the vegetable pieces.

The vegetable product outlet is an opening suitable for withdrawing vegetable product from the vegetable product treatment chamber. Preferably, the vegetable product outlet is provided with a vegetable product removal mechanism that permits removal of the vegetable product in a manner that does not cause undue physical damage or bruising to the vegetable products. In an embodiment, the vegetable product removal mechanism is one or more lift flights that transfers the vegetable product from the vegetable product treatment chamber. One configuration of the lifting flights is shown in U.S. Pat. No. RE 40,232. In an embodiment, the vegetable product removal mechanism is a conveyor positioned at the end of the transport mechanism that transfers the vegetable product from the vegetable product treatment chamber.

The vegetable product removal mechanism preferably is provided with perforations or may be appropriately sized mesh screens to permit liquid to flow through the panel removing the vegetable pieces from the vegetable product treatment chamber. This minimizes the amount of liquid that is removed from the vegetable product treatment chamber from the vegetable product outlet.

Various alternative configurations of the vegetable product inlet, a vegetable product outlet and vegetable product transport mechanism will now be envisioned by the artisan in view of the present disclosure.

The vegetable product is urged toward the vegetable product outlet at a rate so that individual vegetable products reside in the vegetable product treatment chamber for a time of from about 20 minutes to about 60 minutes. In an embodiment, individual vegetable products reside in the vegetable product treatment chamber for a time of from about 25 minutes to about 50 minutes. In an embodiment, individual vegetable products reside in the vegetable product treatment chamber for a time of from about 30 minutes to about 45 minutes.

The vegetable product treatment chamber is provided with at least one liquid introduction orifice for introducing a liquid in the vegetable product treatment chamber. Preferably, multiple liquid introduction orifices are distributed within the vegetable product treatment chamber so that the concentration of any added components to the system, such as pH modifying ingredients, calcium sources or other desired additives, are providing in a manner so that the added components are relatively uniformly distributed in the vegetable product treatment chamber.

In an embodiment, the liquid introduction orifice(s) is a directional nozzle. In an embodiment, a plurality of directional nozzles are located in the vegetable product treatment chamber to enhance mixing of the liquid in the vegetable product treatment chamber.

In an embodiment, the vegetable product treatment chamber is provided with a plurality of manifolds comprising a plurality of liquid introduction orifices. In an embodiment, the manifolds are spaced apart in the vegetable product treatment chamber to enhance mixing of the liquid in the vegetable product treatment chamber.

All of the components used in the present process that contact food are fabricated from materials suitable for food contact, and additionally for high temperature environments as necessary. For example, the vegetable product treatment chamber and components used in the chamber are preferably fabricated from food contact grade stainless steel, ceramic, coated steel, or the like.

The temperature of the vegetable product in the vegetable product treatment chamber is maintained at a temperature of from about 125° F. to about 160° F. In an embodiment, the temperature of the vegetable product is maintained at a temperature of from about 135° F. to about 155° F. In an embodiment, the temperature of the vegetable product is maintained at a temperature of from about 140° F. to about 150° F. Temperature control of the vegetable product may be achieved by regulating the temperature of the materials (i.e. the vegetable product and liquid) in the vegetable product treatment chamber by appropriate temperature control techniques. In an embodiment, the vegetable product treatment chamber is provided with a temperature control jacket. In an embodiment, the temperature of the vegetable product treatment chamber is monitored and heat is added to the vegetable product treatment chamber by activation of heating elements in or adjacent to the treatment chamber, or by addition of heated liquid or steam as required.

The liquid in the vegetable product treatment chamber is maintained at a pH of from about 5 to about 7. In an embodiment, the liquid in the vegetable product treatment chamber is maintained at a pH of from about 5.5 to about 7, or from about 5.5 to about 6.5. In an embodiment, the liquid in the vegetable product treatment chamber is maintained at a pH of from about 6 to about 7. Because the pH of the liquid changes over time during a production run, the pH of the liquid must be monitored. Monitoring of the pH of the liquid may be carried out by any suitable technique, such as use of one or more pH meters mounted at one or more locations in the vegetable product treatment chamber. Alternatively, samples may be removed from the vegetable product treatment chamber and tested by appropriate pH testing techniques. The pH monitoring may be carried out by periodic measurement or continuous real time measurement.

In an embodiment of the present invention, the pH is maintained by addition of a base solution to the liquid via the at least one liquid introduction orifice. The base solution may be any pH lowering ingredient suitable for food contact. In an embodiment of the present invention, the pH lowering ingredient comprises sodium hydroxide.

In an embodiment of the present invention, the vegetable product is contacted with calcium during the treatment step while the vegetable product is in the vegetable product treatment chamber. In an embodiment, the vegetable product is contacted with calcium for a time sufficient for the calcium to absorb into the vegetable product at a concentration of from about 0.05 to about 0.4 wt %. The rate of absorption of the calcium is dependent on many factors, including the texture and surface area of the vegetable, the concentration of the calcium source in the liquid, the temperature of the liquid and the dwell time of the vegetable in the liquid. On consideration of these factors as described herein, the skilled artisan is now able to determine the conditions required to provide a vegetable product with calcium in a concentration of from about 0.05 to about 0.4 wt %. In an embodiment of the present invention, the calcium is provided by addition of a calcium salt solution to the liquid via the at least one liquid introduction orifice. In an embodiment, the calcium is provided in the form of a calcium salt selected from the group consisting of calcium acetate, calcium gluconate, calcium lactate, calcium sulfate and calcium chloride.

A particular advantage of the present method is that large amounts of vegetable product may be processed in an efficient manner. Because the process is a continuous process, the vegetable product treatment chamber in particular may be operated for long runs. This is particularly desirable when processing perishable vegetable items that benefit from prompt treatment after harvest, while the vegetable is at its natural peak in desired texture. Because like vegetables will be harvested at the same time, production facilities must be utilized efficiently while the vegetables are still fresh. Advantageously, the present method may be carried for long continuous production runs. In an embodiment, the continuous process is operated in the vegetable product treatment chamber for a period of from about 2 hours to about 35 hours. In an embodiment, the continuous process is operated in the vegetable product treatment chamber for a period of from about 7 hours to about 33 hours. In an embodiment, the continuous process is operated in the vegetable product treatment chamber for a period of from about 7 hours to about 33 hours.

Additionally, at least a portion of the liquid introduced to the vegetable product treatment chamber remains in the treatment chamber until the treatment chamber is fully discharged of its contents, for example at the end of a production run. This is advantageous from a water conservation perspective, and also from product uniformity and process control perspective.

In an embodiment, the continuous process is operated in the vegetable product treatment chamber for a period of from about 2 hours to about 35 hours before discharge of substantially all liquid from the vegetable product treatment chamber. In an embodiment, the continuous process is operated in the vegetable product treatment chamber for a period of from about 7 hours to about 33 hours before discharge of substantially all liquid from the vegetable product treatment chamber. In an embodiment, the continuous process is operated in the vegetable product treatment chamber for a period of from about 7 hours to about 33 hours before discharge of substantially all liquid from the vegetable product treatment chamber.

In an embodiment of the present invention, the vegetable product treatment chamber is sealed to limit liquid loss to the liquid that is removed from the vegetable product treatment chamber with the vegetable product that is removed via the vegetable product outlet. In this embodiment, a relatively small amount of liquid must be added to the vegetable product treatment chamber to properly conduct the vegetable treatment process.

In another embodiment, the vegetable product treatment chamber is provided with one or more liquid removal outlets to permit removal of additional amounts of liquid from the vegetable product treatment chamber. In an embodiment, the one or more liquid removal outlets continuously removes liquid from the chamber. In an embodiment, the one or more liquid removal outlets removes liquid from the chamber in an operator controlled manner by having, for example operator actuated valves that permit removal of liquid from the chamber as desired. In an embodiment, the operation of the liquid introduction orifice(s) and the one or more liquid removal outlets is coordinated to refresh the liquid occasionally, periodically and/or continuously as determined by the operator. Even in the case of a production run wherein the liquid is frequently refreshed, some retention of liquid and components leeched from the vegetables necessitates control of the pH of the liquid in the vegetable product treatment chamber to remain at a pH of from about 5 to about 7. A process conducted with frequent liquid refresh operations tends to disadvantageously require more liquid, pH adjustment ingredients and calcium source.

After the vegetable product is treated at the relatively low temperature described, above, the vegetable product is blanched in a subsequent blanching step at a temperature ranging from about 190° F. to 210° F. for a time of from about two to about 10 minutes. This blanching step is carried out using equipment and techniques known in the vegetable treatment art.

Vegetables that have been treated by the present continuous process exhibit surprisingly superior organoleptic properties in subsequent product uses as compared to like products where the vegetable has not been so treated. Thus, for example, soups containing carrots prepared by the present method provide statistically significant superior texture scores as compared to like soups containing conventionally prepared carrots when evaluated by trained food product evaluators.

EXAMPLES

Representative embodiments of the present invention will now be described with reference to the following examples that illustrate the principles and practice of the present invention.

Example 1

A test was carried out to show improvement in texture for carrots that are frozen and heated by a retort process. This test is predictive for the relative texture of carrots that may be consumed in certain food preparation applications, such for soup products and the like.

Sample Preparation

Propeel-variety carrots were steam peeled and cut to ⅜" slices, and were subsequently treated by various methods.

Sample A carrots were treated by was followed by introduction to a continuous vegetable product treatment chamber, where the carrots were maintained at a temperature of about 150° F. and the liquid was observed to have a pH of about 6.5.

Sample B carrots were treated by was followed by introduction to a continuous vegetable product treatment chamber, where the carrots were maintained at a temperature of about 150° F. and the liquid was maintained at a pH of about 5. Additionally, the liquid was provided with calcium chloride at a concentration sufficient to provide a calcium chloride concentration of the final carrot product of about 0.38 wt % $CaCl_2$.

Sample C (Control) carrots were not treated in the above manner.

After the above treatments, Samples A, B and C were subjected to a blanch treatment at a temperature of about 190° F. for 7 minutes. All samples were subjected to individual quick freezing. The samples were then subjected to static retort in water pouch at 250° F. for 15 minutes.

Sample Analysis

A texture analysis was performed on a Stable Micro Systems TA.HD texture analyzer. Peak compression force required to forward extrude a 15 g sample tempered to ambient temperature (70° F.) through a ¼" mesh screen was measured. Carrot pieces were randomly stacked in a 1" diameter cylinder. Six replicates were performed, and an average value was reported. Trials are carried out done with a control, non-treated vegetable for a relative texture comparison.

| Results | |
| --- | --- |
| Sample A | 3.1 kg-force |
| Sample B | 5.0 kg-force |
| Sample C (Control) | 1.7 kg-force |

These retort textures also correlate with texture values taken of defrosted IQF frozen carrots that did not undergo the retort process, which is representative of how they may be consumed for less processed applications.

As used herein, the terms "about" or "approximately" mean within an acceptable range for the particular parameter specified as determined by one of ordinary skill in the art, which will depend in part on how the value is measured or determined, e.g., the limitations of the sample preparation and measurement system. Examples of such limitations include preparing the sample in a wet versus a dry environment, different instruments, variations in sample height, and differing requirements in signal-to-noise ratios. For example, "about" can mean greater or lesser than the value or range of values stated by ¹/₁₀ of the stated values, but is not intended to limit any value or range of values to only this broader definition. For instance, a concentration value of about 30% means a concentration between 27% and 33%. Each value or range of values preceded by the term "about" is also intended to encompass the embodiment of the stated absolute value or range of values.

Throughout this specification and claims, unless the context requires otherwise, the word "comprise", and variations such as "comprises" and "comprising", will be understood to imply the inclusion of a stated integer or step or group of integers or steps but not the exclusion of any other integer or step or group of integer or step. When used herein "consisting of" excludes any element, step, or ingredient not specified in the claim element. When used herein, "consisting essentially of" does not exclude materials or steps that do not materially affect the basic and novel characteristics of the claim. In the present disclosure of various embodiments, any of the terms "comprising", "consisting essentially of" and "consisting of" used in the description of an embodiment may be replaced with either of the other two terms.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A continuous method for producing vegetable products having a retained firmness, the method comprising the steps of:
   a) providing a continuous vegetable product treatment device comprising a vegetable product treatment chamber having a vegetable product inlet, a vegetable product outlet, a vegetable product transport mechanism in the vegetable product treatment chamber for urging the vegetable product toward the vegetable product outlet, and at least one liquid introduction orifice for introducing a liquid in the vegetable product treatment chamber;
   b) introducing vegetable products into the vegetable product treatment chamber via the vegetable product inlet;
   c) introducing liquid into the vegetable product treatment chamber via the vegetable product inlet and/or the liquid introduction orifice.
   d) urging the vegetable product toward the vegetable product outlet by operation of the vegetable product transport mechanism while contacting the vegetable product with calcium and maintaining the temperature of the vegetable product in the vegetable product treatment chamber at a temperature of from about 125° F. to about 160°, and the liquid in the vegetable product treatment chamber at a pH of from about 5 to about 7 throughout the continuous method by addition of a base solution to the liquid, the vegetable product being urged toward the vegetable product outlet at a rate so that individual vegetable products reside in the vegetable product treatment chamber for a time of from about 20 minutes to about 60 minutes;
   e) removing the vegetable product from the vegetable product treatment chamber via the vegetable product outlet to provide heat treated vegetable products; and
   f) blanching the heat treated vegetable products in a subsequent blanching step at a temperature ranging from about 190° F. to 210° F. for a time of from about two to about 10 minutes.

2. The method of claim 1, wherein the vegetable product is contacted with calcium for a time sufficient for the calcium to absorb into the vegetable product at a concentration of from about 0.05 to about 0.4 wt %.

3. The method of claim 1, wherein the calcium is provided by addition of a calcium salt solution to the liquid via the at least one liquid introduction orifice.

4. The method of claim 1, wherein the calcium is provided in the form of a calcium salt selected from the group consisting of calcium acetate, calcium gluconate, calcium lactate, calcium sulfate and calcium chloride.

5. The method of claim 1, wherein the vegetable is carrots.

6. The method of claim 1, wherein the vegetable is selected from the group consisting of green beans, green peas, bell peppers, green chilies, ancho chili peppers, cauliflower, cabbage, broccoli, onions, zucchini, celery, carrots, corn, cucumbers, edible peapods, and wax beans.

7. The method of claim 1, wherein the continuous process method is operated in the vegetable product treatment chamber for a period of from about 2 hours to about 35 hours before discharge of all liquid from the vegetable product treatment chamber.

8. The method of claim 1, wherein the continuous process method is operated in the vegetable product treatment chamber for a period of from about 7 hours to about 33 hours before discharge of all liquid from the vegetable product treatment chamber.

9. The method of claim 1, wherein the continuous process method is operated in the vegetable product treatment chamber for a period of from about 16 hours to about 33 hours before discharge of substantially all liquid from the vegetable product treatment chamber.

10. The method of claim 1, wherein the base solution is added to the liquid via the at least one liquid introduction orifice.

11. The method of claim 10, wherein the base solution comprises sodium hydroxide.

12. The method of claim 1, wherein the pH of the liquid in the vegetable product treatment chamber is monitored by periodic measurement.

13. The method of claim 1, wherein the pH of the liquid in the vegetable product treatment chamber is monitored by continuous real time measurement.

14. The method of claim 1, wherein the vegetable product transport mechanism is an auger.

15. The method of claim 1, wherein the vegetable product transport mechanism comprises a conveyer belt.

16. The method of claim 1, wherein the temperature of the vegetable product in the vegetable product treatment chamber is maintained at a temperature of from about 135° F. to about 155° F.

17. The method of claim 1, wherein the temperature of the vegetable product in the vegetable product treatment chamber is maintained at a temperature of from about 140° F. to about 150° F.

18. The method of claim 1, wherein the liquid in the vegetable product treatment chamber is maintained at a pH of from about 5.5 to about 7.

19. The method of claim 1, wherein the liquid in the vegetable product treatment chamber is maintained at a pH of from about 6 to about 7.

* * * * *